United States Patent
Salanne et al.

(10) Patent No.: US 11,873,112 B2
(45) Date of Patent: Jan. 16, 2024

(54) SYSTEM FOR SYNCHRONISING ENERGY SOURCES COUPLED TO AN AIRCRAFT

(71) Applicants: SAFRAN, Paris (FR); SAFRAN ELECTRICAL & POWER, Blagnac (FR)

(72) Inventors: Jean-Philippe Salanne, Moissy-Cramayel (FR); Stéphane Petibon, Moissy-Cramayel (FR); Florent Rougier, Moissy-Cramayel (FR); José Del Castillo, Blagnac (FR); Alexander Salimian, Blagnac (FR)

(73) Assignees: SAFRAN, Paris (FR); SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 17/059,386

(22) PCT Filed: May 29, 2019

(86) PCT No.: PCT/FR2019/051278
§ 371 (c)(1),
(2) Date: Nov. 27, 2020

(87) PCT Pub. No.: WO2019/229390
PCT Pub. Date: Dec. 5, 2019

(65) Prior Publication Data
US 2021/0237894 A1   Aug. 5, 2021

(30) Foreign Application Priority Data

May 29, 2018 (FR) ...................................... 1854575

(51) Int. Cl.
*B64D 41/00* (2006.01)
*H02J 3/40* (2006.01)

(52) U.S. Cl.
CPC .............. *B64D 41/007* (2013.01); *H02J 3/40* (2013.01); *B64D 2221/00* (2013.01); *H02J 2300/28* (2020.01); *H02J 2310/44* (2020.01)

(58) Field of Classification Search
CPC .................................................... H02J 3/36–46
See application file for complete search history.

(56) References Cited

U.S. PATENT DOCUMENTS 5,387,859 A * 2/1995 Murugan ............ H02M 5/4585
290/46
5,581,168 A * 12/1996 Rozman .................. F02N 11/04
290/22

(Continued)

FOREIGN PATENT DOCUMENTS

EP              1515426 A1       3/2005
WO    WO 2018/051003 A1          3/2018

*Primary Examiner* — Daniel Kessie
(74) *Attorney, Agent, or Firm* — BIRCH, STEWART, KOLASCH & BIRCH, LLP

(57) ABSTRACT

The invention relates to a system for sychronising energy sources coupled to an electrical grid supplying at least one electrical load of an aircraft, said system comprising: a main source of electrical energy supplying said electrical load comprising a multi-stage generator, said multi-stage generator comprising: a primary stage comprising a generator with permanent magnets, a secondary stage comprising an excitation, and a tertiary stage comprising a main generator; an auxiliary source of electrical energy supplying said electrical load; and a device for synchronising the main source and the auxiliary source, designed to measure an electrical voltage at the outlet of the primary stage of the main source, and to control the supply of said electrical load by means of the auxiliary source of electrical energy at an electrical voltage slaved to the characteristics of frequency and phase of the electrical voltage of the primary stage.

9 Claims, 2 Drawing Sheets

(56) References Cited

U.S. PATENT DOCUMENTS

Figure 1:
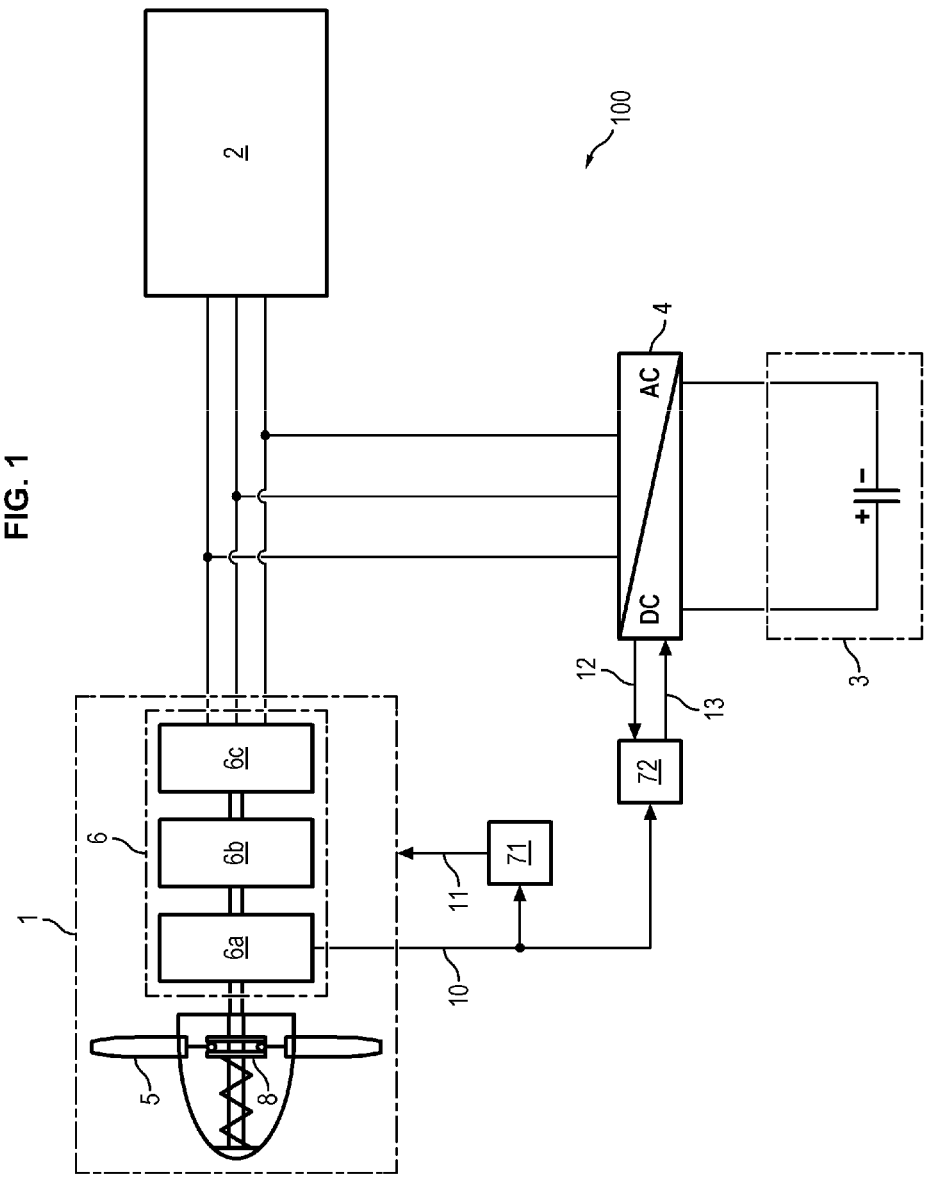

| | | | |
|---|---|---|---|
| 6,844,707 B1 * | 1/2005 | Raad | H02K 19/26 |
| | | | 322/73 |
| 10,177,698 B1 * | 1/2019 | Gao | H02K 19/26 |
| 2005/0180862 A1 | 8/2005 | Lando | |
| 2012/0107086 A1 * | 5/2012 | Bannon | F03D 7/0224 |
| | | | 290/31 |
| 2015/0097372 A1 * | 4/2015 | Patel | H02P 1/16 |
| | | | 290/46 |
| 2015/0180393 A1 * | 6/2015 | Tesch | H02P 9/007 |
| | | | 322/29 |
| 2017/0159577 A1 * | 6/2017 | Hino | H02J 3/46 |
| 2018/0358877 A1 * | 12/2018 | Patel | H02K 1/27 |
| 2019/0225348 A1 | 7/2019 | Salanne et al. | |

* cited by examiner

SYSTEM FOR SYNCHRONISING ENERGY SOURCES COUPLED TO AN AIRCRAFT

GENERAL TECHNICAL FIELD

The invention relates to the field of hybridization, i.e. the simultaneous use of electrical energy sources in an aircraft.

More precisely, the invention has as its object a system, as well as a method, of synchronizing energy sources coupled on an electrical network supplying at least one electrical loads of an aircraft.

PRIOR ART

Hereafter in the description, the aircraft considered is an airplane, by way of an example.

One emergency electric source currently implemented takes the form of an emergency wind turbine, frequently designated under the denomination of "RAT," an acronym of "Ram Air Turbine."

An emergency wind turbine is deployed in emergency situations on board an airplane, to generate suitable electrical power allowing the airplane to fly for a sufficient time until its landing. The emergency wind turbine includes a propeller formed of blades of which the rotation speed is constant (+/−10%). A mechanical system allows regulating the rotation depending on the pressure exerted on the blades. The rotation of this propeller drives a generator which supplies the necessary emergency power to a bus supplying electrically a certain number of critical electrical loads such as flight controls and key avionic circuits.

Typically, an emergency wind turbine is dimensioned so as to supply a maximum value of power for the purpose of satisfying possible consumption peaks of the electrical network of the airplane. In practice, these peaks occur rarely. Most of the time, the electrical power demand is much smaller, and the emergency wind turbine is able to supply electrical power greater than what is needed. The result is over-dimensioned, bulky, heavy and costly emergency wind turbines.

To avoid this over-dimensioning, it is known to hybridize in parallel with the principal electrical source, here the emergency wind turbine, an auxiliary electrical source, for example a source formed of super-capacitors, batteries or others, in order to supply simultaneously the missing power.

Other types of electrical hybridizations can be carried out on the same principle, by way of examples: the parallel association of a fuel battery as a principal electrical source with an auxiliary electrical source, in order to avoid any risk of flooding of the fuel battery and/or its premature deterioration; the parallel association of an auxiliary power unit supplied with fuel as a principal electrical source, with an auxiliary electrical source, in order to prevent any risk of over-consumption of fuel or of overheating of this unit.

In an electrical hybridization system of this type, the implementation of electrical coupling of the alternative electrical sources is of particular importance. In fact, the output of the power sources must be perfectly synchronized in order to carry out efficient power transfer.

Usually, the synchronization of the electrical sources feeding the electrical network is accomplished via a "PLL" (for Phase-Locked Loop) control. This synchronization carried out by using the voltages of the electrical network as references for the PLL control. However, these network voltages can be perturbed (harmonics linked to network electrical loads, short circuits, etc. . . . ) thus impacting the PLL control and consequently the synchronization.

The synchronization of the electrical sources is therefore strongly dependent on the quality of the electrical network, and on perturbations linked to the latter. Such constraints may not be acceptable in the context where reliability is an essential criterion. A context of this type is particularly present in the case of emergency electrical sources of an aircraft.

PRESENTATION OF THE INVENTION

The present invention has as its goal to remedy the aforementioned disadvantages. More precisely, the present invention has as its goal to propose a solution allowing optimizing and toughening the synchronization of different electrical sources on the same alternating electrical network.

To this end, the present invention relates according to a first aspect to a system for synchronizing energy sources coupled on an electrical network supplying at least one electrical load of an aircraft, said system comprising:
  a principal electrical energy source supplying said electrical load comprising a multistage generator set, said multistage generator set comprising:
  a primary stage comprising a permanent-magnet generator,
  a secondary stage comprising an exciter, and
  a tertiary stage comprising a principal generator;
  an auxiliary electrical energy source supplying said electrical load;
  a device for synchronizing the principal source and the auxiliary source, configured to:
  measure an electrical voltage at the output of the primary stage of the principal source, and
  control the supplying of said electrical load by the auxiliary electrical energy source at an electrical voltage slaved to the frequency and phase characteristics of the electrical voltage of the primary stage.

Advantageously, the invention allows toughening the synchronization of different electrical sources on the same alternating electrical network. Consequently, this type of control is particularly suited to aeronautical applications by the toughness that it involves and its simplicity of use, particularly as aeronautical generators are in the majority as regards multistage generators.

Advantageously, but optionally, the system according to the invention can also comprise at least one of the following features:
  the auxiliary electrical energy source is connected in parallel with the principal source by means of a continuous alternating DC/AC power converter;
  the principal electrical energy source corresponds to a rotating source generating electrical energy;
  the principal source is an emergency wind turbine, a turbo-generator, an auxiliary power unit, a variable frequency generator or a fixed-frequency generator;
  the system comprises a control device configured to control the electrical power supply of said electrical load by the principal rotating source generating electrical energy, the rotation frequency of the principal rotating source being regulated in a predetermined frequency interval or not regulated over larger frequency interval;
  the synchronization device is configured to control, by means of the converter, the electrical power supply of said electrical load by the auxiliary electrical energy source at an electrical voltage slaved to the frequency and phase characteristics of the electrical voltage of the primary stage when a frequency of an electrical voltage at the output of the principal source reaches a given frequency threshold value, so as to supply an additional electrical power supply to the electrical load.

According to a second aspect, the invention relates to a device for synchronizing a principal electrical energy source and an auxiliary electrical energy source, said sources being coupled on an electrical network supplying at least one electrical load of an aircraft, said principal electrical energy source comprising a multistage generator set, said multistage generator set comprising:

a primary stage comprising a permanent-magnet generator,
a secondary stage comprising an exciter, and
a tertiary stage comprising a principal generator;
said synchronization device being configured to
measure an electrical voltage at the output of the primary stage, and
control the supplying of said electrical load by the auxiliary electrical energy source at an electrical voltage slaved to the frequency and phase characteristics of the electrical voltage of the primary stage.

Advantageously, but optionally, the device according to the invention can also comprise at least the following feature:

said synchronization device compares a frequency of an electrical voltage at the output of the primary stage to a given frequency threshold value and executes the command when the frequency of an electrical voltage at the output of the principal source reaches the given frequency threshold value so as to supply an additional electrical power supply to the electrical load.

According to a third aspect, the invention relates to a method for synchronizing energy sources coupled on an electrical network supplying at least one electrical load of an aircraft, implemented by a system for synchronizing energy sources coupled on an electrical network supplying said electrical load according to the first aspect, said method comprising the steps consisting of:

measuring, by the synchronization module, the electrical frequency at the output of the primary stage;
controlling, by the auxiliary control device, the supply of said electrical load by the auxiliary electrical energy source at an electrical frequency synchronized to the electrical frequency of the primary stage.

Advantageously but optionally, the method according to the invention can further comprise at least the following feature:

the method includes a step for:
comparing the frequency of the electrical voltages at the output of the primary stage to a given frequency threshold value and executing the control step by said synchronization device when the frequency of an electrical voltage at the output of the principal source reaches the given frequency threshold value so as to supply an additional electrical power supply to the electrical load.

According to a fourth aspect, the invention relates to a computer program product comprising code instructions for the execution of the method according to the third aspect when the program is executed by a processor.

PRESENTATION OF THE FIGURES

Figure 2:
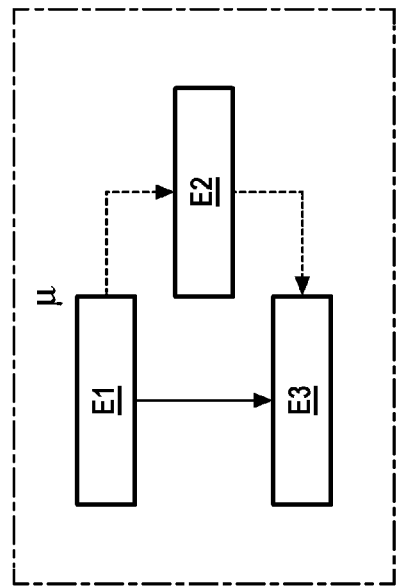

Other features and advantages will appear upon reading the description that follows of an embodiment. This description will be given with reference to the appended drawings, in which:

FIG. 1 illustrates a system for synchronizing energy sources coupled on an electrical network supplying at least one electrical load of an aircraft according to the invention; and FIG. 2 illustrates steps of a method of synchronizing energy sources coupled on an electrical network supplying at least one electrical load of an aircraft according to the invention.

DETAILED DESCRIPTION

FIG. 1 illustrates a system 100 for synchronizing energy sources coupled in an aircraft according to one embodiment, comprising:

a principal source 1 generating electrical energy, commonly designated under the appellation "principal generator set," connected to at least one electrical load 2;
an auxiliary electrical energy source 3 connected in parallel with the principal electrical energy source by means of a converter 4, for example a continuous alternating DC/AC power converter for an electrical network operating on alternating current.

In the example of FIG. 1, the principal source 1 generating electrical energy is an emergency wind turbine comprising blades 5 as well as an electrical generator 6 connected to the electrical load 2 so as to electrically supply it. However, other principal sources 1 generating energy can be considered, by way of examples: a gas turbine, an auxiliary power unit supplied with fuel, a turbo-generator, an auxiliary power unit (APU), a variable frequency generator (VFG), or a fixed frequency generator ("Integrated Drive Generator," IDG).

The electrical generator 6 is based on a three-stage system:

a primary stage 6a called "permanent-magnet generator" (PMG) which supplies the electrical energy allowing the system to be autonomous;
a secondary stage 6b, called an "exciter," which serves to control the magnetization of a tertiary stage 6c; and
a tertiary stage 6c, called the "principal generator," which is the power stage of electrical energy production.

The auxiliary electrical energy source 3 can be accomplished by one or more elements such as a storage battery, a super-capacitor, an inertial flywheel, a fuel better, a thermal battery, a rotating generator associated with power electronics, or by the association of these different elements.

The auxiliary electrical energy source 3 allows supplying electrically the converter 4 which delivers to the electrical load 2, if needed, an additional electrical power supplementing the principal source 1. Such a complementary electrical power is, for example, delivered for the purpose of preventing any risk of stalling of an emergency wind turbine, used as a principal source 1, when the level of use of the principal source 1 reaches a predetermined level. Moreover, although a single electrical load 2 is shown here, it is understood that the principal generating source 1 and the converter 4 can be connected through an electrical power supply bus to a plurality of electrical loads 2. The electrical loads 2 are, by way of an example, flight control actuators, computing units or electrical loads essential to the proper execution of the flight of the aircraft.

Another embodiment for supplying the electrical load 2 can be considered when the principal source 1 is a rotating source generating electrical energy. The principal source 1 can be, by way of examples, an emergency wind turbine or a gas turbine.

A rotating electrical energy source is commonly associated with a mechanical speed regulator 8. By way of an example, for an emergency wind turbine comprising a synchronous electrical generator 6, a speed regulator 8 allows the pitch angle of its blades 5 (corresponding to the angle formed by a blade and the plane of rotation of the blade) to be adapted, so as to supply a regulated rotation speed, and therefore a rotation speed regulated within a frequency interval, but not constant. The electrical frequency at the output of the electrical generator 6 of the wind turbine is then proportional to the rotation frequency.

Under nominal operating conditions, the principal rotating source 1 supplies electrically the electrical load 2 at an electrical frequency which can be linked to a rotation frequency regulated/contained in a predetermined frequency interval. More precisely, this rotation frequency of the principal rotating source 1 is regulated relative to a nominal frequency value and the limits of the predetermined interval correspond to the oscillations in frequency around the nominal frequency. By way of an example, if the principal rotating source 1 is an emergency wind turbine, the upper limit and the lower limit of the predetermined interval are situated typically at more or less 10% of the nominal frequency selected.

In the embodiment considered, the electrical frequency at the output of the principal source 1 is measured and compared with a frequency threshold value. In a synchronous case, the electrical frequency being directly connected to the rotation frequency, this threshold value of frequency can correspond to the lower limit of the predetermined frequency interval, or to a frequency near this lower limit, for example a few tens of Hertz greater.

The principal rotating source 1 can be controlled and supervised by a control device 71 with which it is interfaced.

The control device 71 is configured to control the electrical power supply of the principal rotating source 1. By way of an example, for an emergency wind turbine comprising a synchronous electric generator 6, the control device 71 is configured to receive (arrow 10) the voltage at the output of the generator set and control (arrow 11) the principal source 1 so as to regulate the voltage level of the electrical network to a fixed value. Thus, the control device 71 can regulate the voltage level via the secondary stage 6b of the electrical generator 6.

The control device 71 can also be interfaced with a synchronization device 72 interfaced with the auxiliary source 3 by means of the converter 4.

The converter 4 being connected in parallel with the principal source 1, the synchronization device 72 can be capable of determining the electrical frequency at the output of the principal source 1, i.e. the frequency of the electrical bus supplying the electrical load 2.

FIG. 2 illustrates certain steps of a method of synchronizing energy sources 1, 3 coupled on an electrical network supplying at least one electrical load 2.

The synchronization device 72 is then configured to:
retrieve (arrow 10) a measurement of the electrical voltage via the primary stage 6a of the electrical generator 6 in a step E1,
control (arrow 13) by means of the converter 4, the electrical power supply of the electrical load 2 by the auxiliary source 3 at an electrical voltage synchronized to the frequency and phase characteristics of the electrical voltage of the primary stage 6a, in a step E3. In fact, the frequency and phase characteristics of the electrical voltage of the primary stage 6a not being affected by the electrical load 2, the primary stage 6a can serve as a reliable frequency reference. Thus, the synchronization carried out based on the output characteristics of the primary stage 6a, isolated from the variations of load due to the electrical load 2, allows optimizing the speed of convergence of the frequency and phase characteristics of the electrical voltage of the auxiliary source 3 and of the electrical voltage of the primary stage 6a, and to toughen the synchronization of different electrical sources on the same alternating electrical network.

Synchronization of this type is, by way of an example, accomplished by slaving via a phase-locked loop PLL of the electrical frequency of the auxiliary source 3 to the electrical frequency of the primary stage 6a of the principal source 1.

In fact, within the context of the rotating source, the rotors of the different stages of the generator set 6 turn at the same speed. The network voltages generated at the output of the tertiary stage 6c therefore have a frequency proportional to the voltages generated by the primary stage 6a. The ratio of said frequencies is a function of the number of pairs of poles of the primary stage 6a and the tertiary stage 6c.

The synchronization device 72 can comprise a module (not shown) so as to ensure the synchronization when the ratio of the number of pairs of poles of the permanent-magnet generator 6a and of the principal generator 6c is not equal to 1. In this case, if the permanent magnet generator 6a has a different number of pairs of poles, the pitch angle is multiplied by the ratio of the number of pairs of poles in the permanent-magnet generator 6a and the principal generator 6c.

Likewise, if the permanent-magnet generator 6a is not aligned with the principal generator 6c, i.e. has a constant angular offset, a compensation is applied to the pitch angle.

Moreover, the converter 4 being connected in parallel with the principal source 1, the synchronizing device 72 can also be configured to:
retrieve (arrow 12) a measurement of the electrical frequency at the terminals of the converter 4 and determine the frequency of the electrical voltage at the output of the principal source 1, i.e. the frequency of the electrical bus supplying the electrical load 2,
compare the measurement of the frequency of the electrical voltage to the frequency threshold value in a step E2, and
execute the control of step E3 (arrow 13) when the frequency of an electrical voltage at the output of the principal source 1 reaches the given frequency threshold value so as to supply an additional electrical power supply to the electrical load 2.

As an alternative, the synchronization device 72 can deduce from measurement of the electrical frequency of the principal source 1 the level of use of the rotating principal source 1, compare this level of use relative to the limiting level of use, expressing a level of over-use of this source, and command the supply of the auxiliary source 3 depending on the result of this comparison.

The set of operations described above is realized in real time and continuously over time.

Advantageously, the synchronization system (100) described for a rotating principal source 1 is particularly simple to implement, this requiring no modification (ex: pre-dimensioning the static voltage characteristics, reconfiguration of the electrical generator 6) of the existing rotating sources (ex: emergency wind turbine, turbines).

Consequently, the synchronization (100) described allows using the alternating voltages generated by the primary stage of a multistage generator set as a reference for the synchronization (by PLL) of the auxiliary source on the electrical network. This solution allows dispensing with the constraints linked to the quality of the electrical network such as voltage harmonics, imbalances and short circuits, etc.

As the wave shapes of the voltages of the primary stage 6c are not dependent on the electrical network, the synchronization system (100) described allows dispensing with the perturbations linked to the network, and thus have a more robust synchronization system.

Moreover, the synchronization system (100) described allows attaining the convergence of the synchronization much more rapidly than in the case where the voltage at the output of the generator set is used.

The synchronization system (100) described therefore allows toughening the synchronization of different electrical sources on the same alternating electrical network. Consequently, this type of control is particularly adapted to aeronautical applications by the robustness that it involves and its simplicity of use, particularly as the aeronautical generators are multistage generators.

The invention claimed is:

1. A system (100) for synchronizing energy sources coupled on an electrical network supplying at least one electrical load (2) of an aircraft, said system comprising:
   a principal electrical energy source (1) configured to supply said electrical load with a principal electrical power, comprising a multistage generator set (6), said multistage generator set (6) comprising:
      a primary stage (6a) comprising a permanent-magnet generator,
      a secondary stage (6b) comprising an exciter, and
      a tertiary stage (6c) comprising a principal generator connected to said electrical load;
   an auxiliary electrical energy source (3) configured to supply said electrical load (2) with an additional electrical power supplementing the principal electrical power;
   a converter (4) through which the auxiliary electrical energy source (3) is connected with the electrical load (2) in parallel with the principal electrical energy source;
   a synchronization device (72) for synchronizing the principal source (1) and of the auxiliary source (3), configured to:
      measure an electrical voltage generated by the permanent-magnet generator of the primary stage (6a) of the multistage generator set (6);
      measure an electrical frequency at terminals of the converter
      compare the measured electrical frequency to a frequency threshold or compare a level of use of the principal electrical energy source deduced from the measured electrical frequency to an over-use threshold;
      when the measured electrical frequency is above the frequency threshold or when the level of use of the principal electrical energy source is below the over-use threshold, control the converter for the electrical load to be supplied with only the principal electrical power; and
      when the measured electrical frequency reaches the frequency threshold or when the level of use of the principal electrical energy source reaches the over-use threshold, control the converter for the electrical load to be supplied with both the principal electrical power and the additional electrical power and for an electrical frequency of the additional electrical power to be slaved by a phase-locked loop to the frequency of the measured electrical voltage.

2. The system (100) according to claim 1, wherein the converter is a continuous alternating DC/AC power converter (4).

3. The system (100) according to claim 1, wherein the principal electrical energy source (1) corresponds to a rotating source (1) generating electrical energy.

4. The system (100) according to claim 1, wherein the principal source (1) is an emergency wind turbine, a turbogenerator, an auxiliary power unit, a variable frequency generator or an integrated drive generator.

5. The system (100) according to claim 3, further comprising a control device (71) configured to control the electrical power supply of said electrical load (2) by the rotating source (1) generating electrical energy, the rotation frequency of the rotating source (1) being sudden or regulated in a predetermined rotation frequency interval.

6. A device (72) for synchronizing a principal electrical energy source (1) and an auxiliary electrical energy source (3), said sources being coupled on an electrical network feeding at least one electrical load (2) of an aircraft,
   said principal electrical energy source (1) comprising a multistage generator set (6), said multistage generator set (6) comprising:
      a primary stage (6a) comprising a permanent-magnet generator,
      a secondary stage (6b) comprising an exciter, and
      a tertiary stage (6c) comprising a principal generator connected to said electrical load;
   said auxiliary electrical energy source being connected to the electrical load in parallel with the principal electrical energy source by a converter and configured to supply the electrical load (2) with an additional electrical power supplementing the principal electrical energy source;
   said synchronization device (72) being configured to:
      measure an electrical voltage generated by the permanent-magnet generator of the primary stage (6a) of the multistage generator set (6),
      measure an electrical frequency at terminals of the converter;
      compare the measured electrical frequency to a frequency threshold or compare a level of use of the principal electrical energy source deduced from the measured electrical frequency to an over-use threshold;
      when the measured electrical frequency is above the frequency threshold or when the level of use of the principal electrical energy source is below the over-use threshold, control the converter for the electrical load to be supplied with only the principal electrical power; and
      when the measured electrical frequency reaches the frequency threshold or when the level of use of the principal electrical energy source reaches the over-use threshold, control the converter for the electrical load to be supplied with both the principal electrical power and the additional electrical power and for an electrical voltage of the additional electrical power to be slaved to the frequency and phase characteristics of the measured electrical voltage.

7. A method for synchronizing energy sources coupled on an electrical network supplying at least one electrical load of an aircraft, implemented by a system (100) for synchronizing energy sources coupled on an electrical network supplying said electrical load, said system comprising:

a principal electrical energy source (1) supplying said electrical load, comprising a multistage generator set (6), said multistage generator set (6) comprising:

a primary stage (6a) comprising a permanent-magnet generator, a secondary stage (6b) comprising an exciter, and a tertiary stage (6c) comprising a principal generator connected to said electrical load;

an auxiliary electrical energy source (3) configured to supply said electrical load (2) with an additional electrical power supplementing the principal electrical energy source;

a converter (4) through which the auxiliary electrical energy source (3) is connected with the electrical load (2) in parallel with the principal electrical energy source;

a synchronization device (72);

said method comprising steps consisting of:

measuring (E1), by the synchronization device, an electrical voltage generated by the permanent-magnet generator of the primary stage (6a) of the multistage generator set (6), measuring an electrical frequency at terminals of the converter;

comparing the measured electrical frequency to a frequency threshold or comparing a level of use of the principal electrical energy source deduced from the measured electrical frequency to an over-use threshold;

when the measured electrical frequency is above the frequency threshold or when the level of use of the principal electrical energy source is below the over-use threshold, control the converter for the electrical load to be supplied with only the principal electrical power; and when the measured electrical frequency reaches the frequency threshold or when the level of use of the principal electrical energy source reaches the over-use threshold, controlling (E3) the converter, by the synchronization device (72), for the electrical load to be supplied with both the principal electrical power and the additional electrical power and for an electrical frequency of the additional electrical power to be slaved to the frequency of the measured electrical voltage.

8. A computer program product comprising code instructions for the execution of a method according to claim 7, when the program is executed by a processor.

9. A system (100) for synchronizing energy sources coupled on an electrical network supplying at least one electrical load (2) of an aircraft, said system comprising:

a principal electrical energy source (1) configured to supply said electrical load with a principal electrical power, comprising a multistage generator set (6), said multistage generator set (6) comprising:

a primary stage (6a) comprising a permanent-magnet generator, a secondary stage (6b) comprising an exciter, and a tertiary stage (6c) comprising a principal generator connected to said electrical load;

an auxiliary electrical energy source (3) configured to supply said electrical load (2) with an additional electrical power supplementing the principal electrical power;

a converter (4) through which the auxiliary electrical energy source (3) is connected with the electrical load (2) in parallel with the principal electrical energy source;

a synchronization device (72) for synchronizing the principal source (1) and of the auxiliary source (3), configured to:

measure an electrical voltage generated by the permanent-magnet generator of the primary stage (6a) of the multistage generator set (6);

measure an electrical frequency at terminals of the converter;

compare the measured electrical frequency to a frequency threshold;

when the measured electrical frequency is above the frequency threshold, control the converter for the electrical load to be supplied with only the principal electrical power; and when the measured electrical frequency reaches the frequency threshold, control the converter for the electrical load to be supplied with both the principal electrical power and the additional electrical power and for an electrical frequency of the additional electrical power to be slaved by a phase-locked loop to the frequency of the measured electrical voltage.

* * * * *